United States Patent Office 2,845,503
Patented July 29, 1958

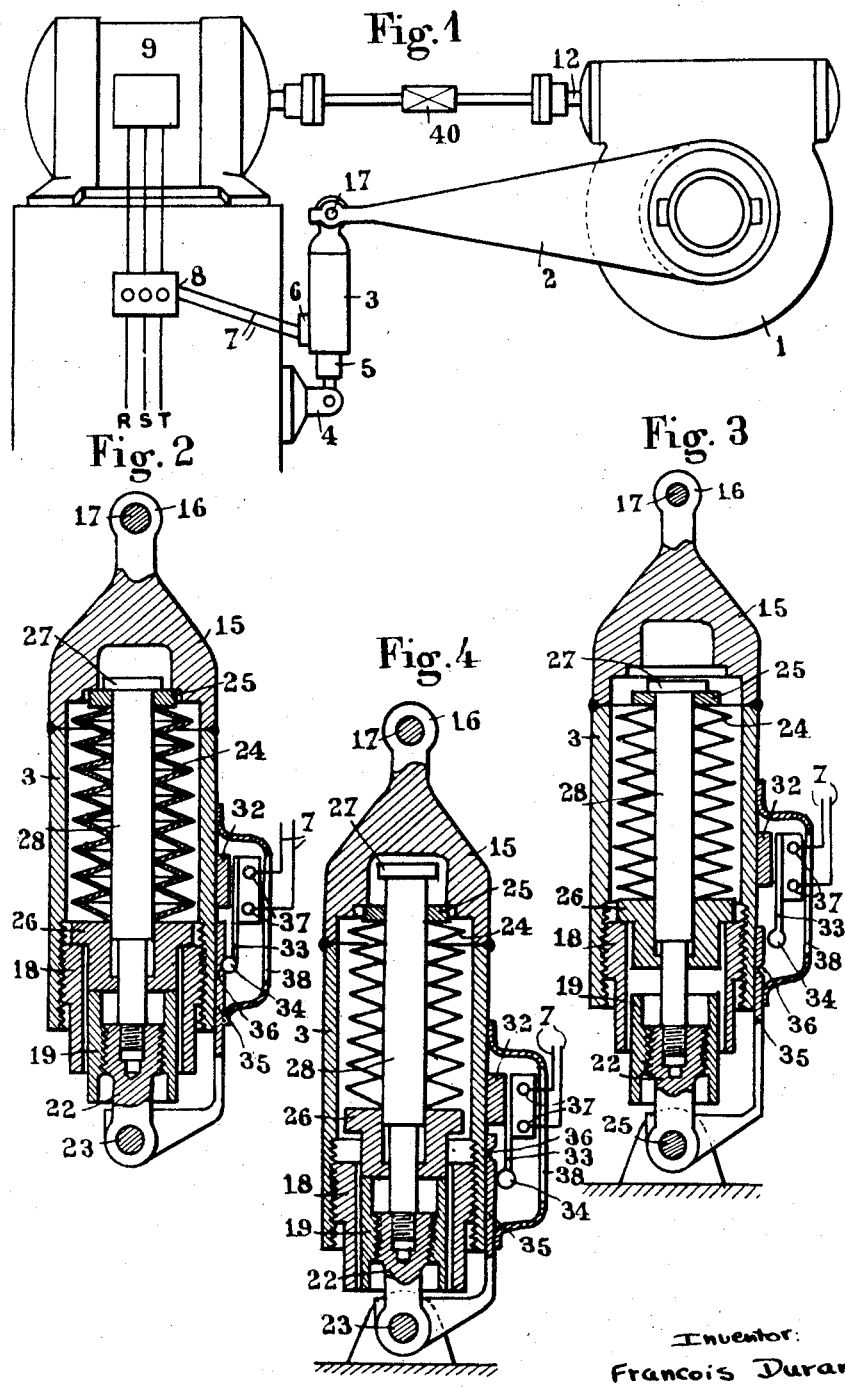

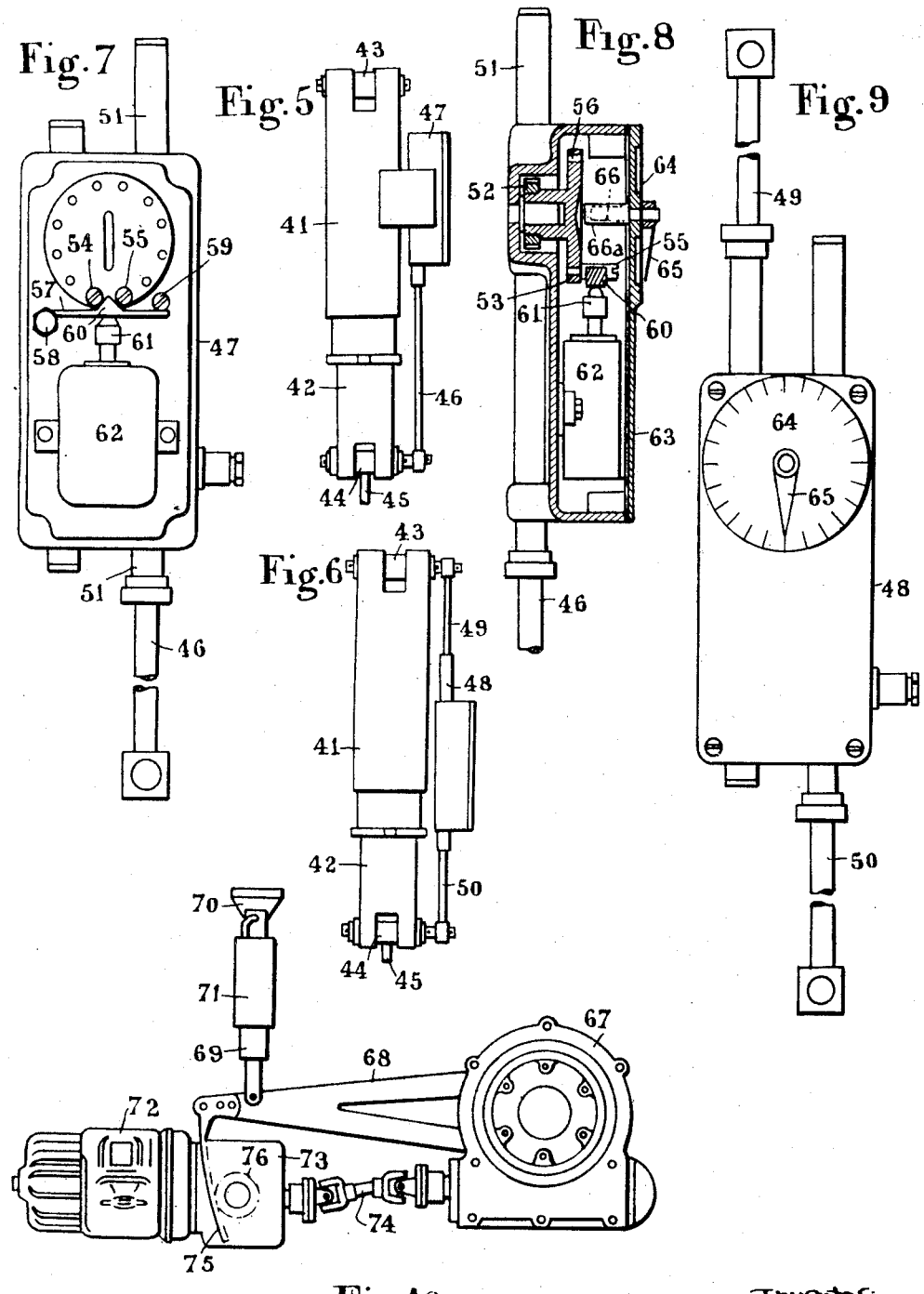

2,845,503

POWER MEANS FOR DRIVING A ROTARY SHAFT

François Durand, Le Vesinet, France

Application July 19, 1955, Serial No. 522,996

8 Claims. (Cl. 200—52)

This invention relates to a power arrangement for driving a rotary shaft through a reduction gear mounted directly in overhanging relationship on the end of the shaft to be driven, i. e. of the type wherein the wheel of the last gear train journalled in the reduction gear casing is mounted directly on the end of the shaft of the machine or apparatus to be driven. Preferably, this reduction gear consists of a straight worm gear or an hour-glass worm gear wherein the worm is driven from the motor and the wheel wedged directly on the shaft to be driven.

According to this invention the reduction gear casing is connected to a stationary part through a double-acting dynamometric device comprising two members movable with respect to each and adapted to be connected to the reduction gear casing and to the stationary part, respectively, a resilient coupling between these two movable members, and a control member responsive to any variations in the distance between these movable members and therefore to any variations in the reaction torque acting on the driven shaft, so that these variations may be used for either signalling purposes or driving a servo mechanism.

According to one of the essential features of the invention the power arrangement will automatically limit the stress transmitted through the driven shaft. The member responsive to variations in the distance between the different components of the dynamometric device may thus cause the reduction gear driving electromotor to either be deenergized when the torque transmitted from the reduction gear to the machine to be driven exceeds a predetermined value, and/or actuate a signalling device.

According to another feature of this invention the sensitiveness of the power arrangement to variations in the reaction torque acting on the driven shaft may be utilized for acting automatically on the causes having originated these torque variations. Thus, for example, the present invention may be applied in a particularly useful manner to the mixing or malaxing of chemical substances, since the velocity of rotation of the stirring shaft may be adjusted according to the consistency or viscosity of the substance treated; similarly, the displacements produced within the dynamometric device may advantageously be used for starting auxiliary motors adapted to cope with any overload.

According to the present invention, the displacements of the members reacting when variations occur in the resisting torque may also be used for setting a variable-speed drive interposed between the driving motor and the reduction gear.

The arrangement according to this invention is also advantageous in that the machine driven through the reduction gear operates more smoothly since any relatively low torque variations—the value of which would be lower than a critical value at which the control member becomes operative—are absorbed automatically by the dynamometric device acting as a shock-absorber. More particularly, any vibration is damped out to a substantial extent so that any resilient or elastic coupling may be dispensed with.

Other specific features and advantages of this invention will appear as the following description proceeds with reference to the attached drawings forming part of this specification and illustrating diagrammatically by way of example a preferred embodiment of a power arrangement according to this invention.

In the drawings:

Fig. 1 is a front view showing a worm-and-wheel reduction gear associated with a dynamometric double-acting device according to the invention;

Fig. 2 is a longitudinal section of the dynamometric device alone;

Figs. 3 and 4 are sections similar to Fig. 2 but showing the positions of the various elements when tractive and compressive stresses are applied thereto, respectively;

Fig. 5 is a side view showing a modified embodiment of the dynamometric device;

Fig. 6 is a side view showing a modified embodiment of the device shown in Fig. 5;

Fig. 7 is an elevational view showing the device of Fig. 5 with the casing cover removed;

Fig. 8 is a vertical sectional and side view of the device of Fig. 7;

Fig. 9 is an outer elevational view of the device of Fig. 6, and

Fig. 10 is a side-elevational view of a power arrangement associated with a variable-speed drive.

Referring to the drawings, Fig. 1 thereof illustrates an arrangement comprising a casing 1 of a worm-and-wheel reduction gear of the type wherein the tangent wheel is journalled directly in the reduction-gear casing 1 by having its hub mounted directly on the end portion of the shaft of the machine or apparatus to be driven. Of course, in this type of reduction gears the casing 1 must be held against rotation.

According to the present invention this is achieved by providing a reaction arm 2 rigid with the reduction-gear casing 1 and having its free or outer end operatively connected to one end of a dynamometer 3 connected in turn through its opposite end to a stationary part consisting for example either of a support anchored in the floor or of a bracket 4, as illustrated, secured on the base of an electromotor 9 adapted to drive the shaft 12 of the worm in the reduction gear.

This electromotor 9 is operatively connected through a Cardan drive 40 to the worm shaft 12, this drive allowing for slight misalignments of the fast-rotating shaft 12 of the reduction gear which are occasioned by the operation of the dynamometer 3 which, according to a possible feature of the invention, comprises a movable member 5 and may thus serve as a torque limiter.

To this end, the displacement of a piston 5 within the dynamometer 3, as will be explained later on, is utilized for actuating a switch 6 connected through conductors 7 to the control box 8 supplying electric current to the electromotor 9 intended to drive the shaft 12 of the reduction-gear worm. It will be readily apparent that the dynamometer 3 acts not only as a device for regularizing the operation of the machine driven through the reduction gear by damping out any vibration and jerks from the drive but also, and particularly in the example contemplated herein, as a torque limiter, for when this torque exceeds a predetermined limit the switch 6 is actuated and deenergizes the electromotor 9 driving the reduction gear. The operation of this assembly will be better understood if reference is made to its detailed structure as set forth hereinafter.

Considering now Fig. 2 of the drawings it will be seen that the dynamometric device 3 of Fig. 1 is illustrated in axial section therein and comprises a cylindrical hollow body 3 having welded on its upper portion a head 15 provided with an eye 16 through which extends a pin 17 for pivotally attaching the dynamometer on the outer or free end of the arm 2 (see Fig. 2).

The lower portion of the bore in the cylindrical body 3 has an internally-threaded portion engaged by a guide socket 18 having slidably mounted therein a piston 19 rigid with a lug 22 engaged by a pin 23 serving as a fulcrum to the dynamometer assembly relative to the stationary support or bracket 4. A plurality of resilient washers, e. g. dished washers 24, are stacked in axial alignment within the cylindrical body 3 bear at the top against a stop washer 25 engaging the head 15 and at the bottom against a stop ring 26 engaging the upper face of the guide socket 18.

The stacking of resilient washers 24 may be compressed either by the vertical displacement of the stop ring 26 when the piston 19 moves upwards and therefore exerts a thrust against this ring, or by the downward displacement of the stop washer 25 moved by the head 27 of the rod 28 in screw-threaded engagement in the lower lug 22 fast with the piston 19 as the latter is pulled downwards.

On the hollow cylinder 3 there is secured an electrical switch 32 the operating member of which consists of a blade 33 carrying at its free end a roller 34 co-acting with a cam 35 connected to the lower lug 22 and having a notch 36 formed therein. This notch 36 is so shaped that when the piston 19 is moved within the cylindrical body 3 beyond a predetermined longitudinal distance in one or the other direction the switch 32 is actuated by this cam 35. The switch 32 is provided with two terminals 37 having connected thereto the aforesaid conductors 7 (see Fig. 1). Finally, this switch 32 is enclosed in a protective cover or housing 38 secured on the cylindrical body 3 through any suitable and known fastening device.

The torque-limiting damping device described hereinabove operates as follows:

When the electromotor 9 (Fig. 1) is energized and drives the shaft 12 of the reduction-gear worm the reaction torque exerted by the shaft of the driven machine, which is wedged in the hub of the tangent wheel of the reduction gear, tends to rotate the casing 1 of the reduction gear in a direction opposite to the movement of rotation of the aforesaid tangent wheel. As a result, the lever 2 rigid with the casing 1 is driven either upwards or downwards according as the tangent wheel rotates in one or the other direction of rotation of the tangent wheel, so that the complete double-acting dynamometric device 3 will be stressed either for elongation or for compression.

Let us consider firstly the case wherein the dynamometric device is subjected to extension stress, i. e. in which the head 15 thereof is lifted. This head 15 will carry along during its upward movement the cylindrical body 3 and guide socket 18 screwed in the lower portion of the body. The upward movement of this socket 18 will produce a similar movement of the stop ring 26 (see Fig. 3). Now the stop washer 25 cannot rise as it is retained by the head 27 of the rod 28 screwed in the lug 22 pivoted in turn on the stationary bracket 4; as a result, the washer stacking 24 is compressed as the stop ring 26 moves toward the stop washer 25. If the resisting torque having caused the relative displacement of these various members does not exceed a predetermined limit value, the device will be in a condition of stable equilibrium since the stroke of the cam 35 is not sufficient to actuate the switch 32. If on the contrary a torque of an abnormally high value takes place suddenly this will cause the resilient washers to be compressed to a substantially greater extent and when the extremity of the notch 36 in the rectilinear cam 35 registers with the roller 38 the latter is raised and the switch 32 is actuated. Consequently, this switch 32 will open the circuit energizing the electromotor 9 driving the reduction gear. Thus, the driving torque is suppressed immediately and if this torque is still applied during a short time period due to moments of inertia in the moving parts of the arrangement the resilient dished washers 24 may still, according to their dimensions and characteristic, absorb the whole or part of the corresponding kinetic energy by undergoing a further compression if required, the assembly being so arranged that the electromotor 9 is deenergized by the opening of its current-supply circuit at switch 32 shortly before the piston 19 has accomplished its maximum stroke within the cylinder 3. The stacking of dished washers will then resume their initial, unstressed condition so as to restore the stop ring 26 in engagement with the guide socket 18, and on the other hand all the parts will resume their original positions in which they are shown in Fig. 2.

According to the arrangement and purposes contemplated the electromotor 9 may be re-energized when the different parts have resumed their neutral positions, unless it is deemed preferable to re-start the electromotor 9 by hand. As a rule, this latter type of control will be preferred as it makes it possible to ascertain whether any failue or abnormal operation has occurred and to find out the cause thereof before it is attempted to re-start the machine. In this case, it will be sufficient, for example, to connect the switch 6 of Fig. 1 through conductors 7 across the stick-contact of the relay mounted within the control-box 8 and adapted to supply electric current from a three-phase mains R. S. T.

In the foregoing it has been assumed that the lever 2 of the reduction gear (Fig. 1) was driven upwards. If the direction of rotation of the reduction gear were reversed, this lever 2 would be driven downwards and the dynamometric device assembly would therefore be subjected to a compression stress instead of an extension stress as contemplated hereinabove. In this case the device will operate in the manner just described except that the dished washers 34, instead of being compressed by the upward movement of the stop ring 26 with the stop washer 25 held against motion, are now compressed by the downward movement of the head 15, the stop ring 26 remaining stationary due to its engagement with the upper face of the piston 19 connected to the stationary part 23. The damping effect will be obtained, under this compressive stress, under the same conditions as in the preceding case of an extension stress, and the switch 32 will be again actuated to de-energize the electromotor 9 when the resisting torque in the reduction gear has overstepped the predetermined value at which the apparatus was set beforehand.

It will be readily understood that the device shown and described herein has the dual function of a shock-absorber, whereby any flexible or resilient coupling may be dispensed with, and, in the specific case considered, of a torque limiter adapted to disconnect the driving electromotor from its current supply.

The use of a device of this type is particularly advantageous in hoisting and conveying apparatus wherein accidental stresses higher than normal stresses are more likely to be produced than in most other machines.

Of course, the invention is not limited to the form of embodiment shown and described which is given solely by way of example. Thus, the apparatus described is adapted to operate under both compressive and extension stress, but it will be readily understood that the apparatus may also be designed for operation in a single direction, i. e. either under compressive stress or extension stress only.

It is also assumed in this example that the reduction-gear driving motor is controlled through a switch and electric conductors, but anybody conversant with the art will readily appreciate that pressure-fluids such as compressed air or oil may also be employed for this purpose; in this case the electric switch will be replaced by a valve or like device.

Although it has been assumed that the torque limiter operates automatically to disconnect the current supply from the electromotor driving the reduction gear, it is also possible to cause this torque limiter to actuate more simply signalling means adapted to warn an operator or conductor of the machine equipped with the power arrangement of this invention that the resisting torque has attained a value higher than the normal values permissible without impairing the safety of the machine.

In the foregoing it has been contemplated to use a mounting wherein the worm of the reduction gear 1 (Fig. 1) is driven from a motor 9 through a Cardan drive 40. Of course, any other suitable transmission may be used according to the specific application for which the invention is contemplated. Thus, the electromotor may be carried by the reduction gear 1 and adapted to drive the worm either directly or through a primary reduction gear, also of the worm-and-wheel type, having its worm wedged directly on the motor shaft and the tangent wheel wedged on the worm shaft of the main or larger reduction gear 1, so that the assembly will constitute a power-and-reducing unit.

In Fig. 5 of the drawing there is shown in elevational view a different embodiment of the dynamometric device made in accordance with the principles of this invention. This assembly comprises a cylinder 41 surrounding the stacking of dished washers and the piston 42, the cylinder 41 and piston 42 corresponding respectively to the elements 3 and 19 of Figs. 2, 3 and 4. The reaction arm of the floating reduction gear (not shown in Fig. 5) is pivoted on a pin 43 and another pin 44 carries on the one hand a rod 45 through which it is attached to the stationary part of the plant and on the other hand a rod 45 engaging the box 47 secured on the outer wall of the cylinder 41 and containing the electrical control device.

As the control box 47 is rigid with the cylinder 41 any displacement of the latter resulting from a compression or a traction exerted by the reaction arm will cause the control box to move relative to the rod 46. This relative movement is utilized by the control device to be described later on.

The device of Fig. 5 is particularly suitable for short movements of the cylinder 41. When these movements have a greater amplitude the control box becomes independent of the cylinder (Fig. 6) and the control device mounted in the casing 48 is actuated simultaneously by a pair of rods 49, 50 connected to the pins 43, 44 respectively.

The device mounted in the control box or casing 47 of Fig. 5 is shown in detail in Figs. 7 and 8. This casing has mounted on its top a tube 51 having slidably mounted therein a rod 46 formed in turn with a rack extending along one portion of its length. This rack meshes with a toothed pinion 52 keyed on the hub of a rotary disc 53 carrying a pair of projecting pins 54, 55, these pins being inserted in two of a series of peripheral holes 56 drilled in the disc 53.

These pins co-act with a lever 57 pivoted at one end on a pin 58 and engaging with its other end a stop 59. This lever carries a cam 60 and rests on the push-member 61 of an electric control switch 62 of any known and suitable type.

The device described hereinabove operates as follows: any displacement of the casing 47 relative to the rack 46 rotates the disc 53 through a certain angle. When the torque transmitted through the reaction arm becomes important the corresponding rotation of the disc 53 will cause one or the other pin 54, 55 to move the cam 60 on lever 57 so as to depress the push-member 61. Thus, any desired operation may be controlled, for example the de-energizing of a driving motor, the actuation of signalling means, the starting of another motor, etc. On the cover 63 of the casing a graduated dial 64 may be provided and a pointer 65 will indicate thereon the value of the torque to which the plant is subjected. To this end, the pointer 65 is carried by a shaft 66 rigid with the dividing disc 53. In case the torque indicator 65 were not employed, the disc 53 may be held away from the cover 63 by a stud 66a so as to keep the pinion 52 in meshing engagement with the rack 51.

The elevational front view of the casing 48 of Fig. 6 is shown in Fig. 9. The pinion of the dividing disc 53 is rotated by the rack formed on the rod 49 secured on the pin 43 of the cylinder 41 (see Fig. 6) and this pinion engages the rack formed on the rod 50 so that the casing 48 will be moved through a distance representing one-half of the stroke effected by the cylinder 41. The arrangement of the torque limiter within the casing 48 may be the same as that described hereinabove with reference to the casing 47.

Another form of embodiment of the power arrangement according to this invention is illustrated in Fig. 10. The reduction gear 67 of the worm-and-wheel type is mounted directly on the shaft to be driven and carries a reaction arm 68 pivoted on the double-acting dynamometric device 69 of the type already described hereinabove and illustrated in Figs. 2, 3 and 4 of the drawings, the other end of this dynamometric device being pivotally attached on the stationary bracket 70. The shock-absorber 69 carries the control device shown diagrammatically at 71.

The electromotor 72 drives the reduction gear 67 through the medium of a variable-speed gear 73 and a Cardan drive 74.

On the free end of the reaction arm 68 there is secured a toothed segment 75 meshing with a toothed wheel 76 controlling the variable-ratio transmission constituted by the variable-speed unit 73. During the operation of this assembly the reduction gear 67 oscillates through an angle proportional to the resisting torque produced in the driven shaft. This angular displacement will cause the segment 75 and toothed wheel 76 to effect a proportional variation in the transmission ratio between the motor 72 and reduction gear 67. When the maximum resisting torque contemplated is attained the electric limiter 71 may, if desired, open the circuit supplying the electric power to the motor and the plant will be brought to a standstill. Therefore, this arrangement may be used for protecting an installation against any overload or undue stresses.

The variations in the resisting torque produced in the shaft driven through the floating reduction gear may be applied to and employed by means of dynamometric cells for example of the hydraulic type, if desired.

The double-acting dynamometric device associated with a variable-speed drive is applicable mainly in plants wherein it is particularly advantageous to cause the velocity of rotation of a shaft to vary as a function of the resisting torque. This is notably the case in machines of the type employed for malaxing or mixing chemical substances, wherein the velocity of the malaxing member is to be adjusted according to the consistency or viscosity of the substances treated in the apparatus. Another application of such units lies in the control of a hoisting apparatus wherein the member responsive to the stress or load applied to the dynamometric device may be arranged to start or stop one or more auxiliary electromotors.

What I claim as new is:

1. A power arrangement comprising, in combination, transmission means adapted to transmit power from a suitable source to a shaft to be driven with a predetermined transmission ratio, said transmission means including an output member adapted to be connected directly to the shaft to be driven; a casing housing said transmission means and being freely turnable with respect to said output member so that said casing is also turnable with respect to a shaft connected to said output member to be driven thereby; a rigid arm fixed to and extending from said casing so as to be turnable together with the latter and having a free end distant from said casing; a stationary support; a first elongated member connected to said support; a second elongated member connected to said free end of said arm and being longitudinally shiftable with respect to said first elongated member; and resilient means operatively connected to said first and second elongated members for yieldably resisting movement of said second elongated member with respect to said first elongated member to the same degree in either direction of movement of said second member with respect to said first member.

2. A power arrangement comprising, in combination, transmission means adapted to transmit power from a suitable source to a shaft to be driven with a predetermined transmission ratio, said transmission means including an output member adapted to be connected directly to the shaft to be driven; a casing housing said transmission means and being freely turnable with respect to said output member so that said casing is also turnable with respect to a shaft connected to said output member to be driven thereby; a rigid arm fixed to and extending from said casing so as to be turnable together with the latter and having a free end distant from said casing; a stationary support; a first elongated member connected to said support; a second elongated member connected to said free end of said arm and being longitudinally shiftable with respect to said first elongated member; resilient means operatively connected to said first and second elongated members for yieldably resisting movement of said second elongated member with respect to said first elongated member to the same degree in either direction of movement of said second member with respect to said first member; and control means operatively connected to said second member for sensing the movement thereof with respect to said first member.

3. A power arrangement comprising, in combination, transmission means adapted to transmit power from a suitable source to a shaft to be driven with a predetermined transmission ratio, said transmission means including an output member adapted to be connected directly to the shaft to be driven; a casing housing said transmission means and being freely turnable with respect to said output member so that said casing is also turnable with respect to a shaft connected to said output member to be driven thereby; an arm member fixed to and extending from said casing so as to be turnable together with the latter and having a free end portion distant from said casing; a stationary support member; a cylinder and a piston coaxial with and extending into said cylinder, said cylinder and piston being movable one with respect to the other and said cylinder and piston being connected respectively to said members so that the position of said cylinder and piston with respect to each other is determined by the movement of said arm member with respect to said support member; and resilient means within said cylinder operatively engaging the latter and said piston for yieldably resisting movement of said arm to the same degree in either direction.

4. A power arrangement comprising, in combination, transmission means adapted to transmit power from a suitable source to a shaft to be driven with a predetermined transmission ratio, said transmission means including an output member adapted to be connected directly to the shaft to be driven; a casing housing said transmission means and being freely turnable with respect to said output member so that said casing is also turnable with respect to a shaft connected to said output member to be driven thereby; an arm member fixed to and extending from said casing so as to be turnable together with the latter and having a free end portion distant from said casing; a stationary support member; a cylinder and a piston coaxial with and extending into said cylinder, said cylinder and piston being movable one with respect to the other and said cylinder and piston being connected respectively to said members so that the position of said cylinder and piston with respect to each other is determined by the movement of said arm member with respect to said support member; an elongated rod fixed to said piston and extending therefrom along the interior of said cylinder, said rod having an enlarged end portion distant from said piston; a pair of rigid annular members surrounding said rod and being slidable therealong, one of said annular members engaging said piston in one position of said piston and cylinder so that said piston limits movement of said one annular member in one direction along said rod, and the other of said annular members engaging said enlarged end portion of said rod in a given position of said piston and cylinder so that said enlarged rod end portion limits movement of said other annular member along said rod in a direction opposite to said one direction, said annular members respectively having inner faces directed toward each other and outer faces directed away from each other and said cylinder respectively having in its interior a pair of annular shoulders directed toward each other and engaging said outer faces of said annular members so that when said cylinder and piston alter their relative position to a position which reduces the volume of the space within said cylinder said other annular member becomes located between said enlarged end portion of said rod and said piston while when said cylinder and piston alter their relative position to a position which increases the volume of the space within said cylinder said one annular member becomes located apart from said piston and between the latter and said enlarged end portion of said rod; and spring means engaging said inner faces of said annular members and extending between the same for urging said annular members apart from each other.

5. A power arrangement comprising, in combination, transmission means adapted to transmit power from a suitable source to a shaft to be driven with a predetermined transmission ratio, said transmission means including an output member adapted to be connected directly to the shaft to be driven; a casing housing said transmission means and being freely turnable with respect to said output member so that said casing is also turnable with respect to a shaft connected to said output member to be driven thereby; a rigid arm fixed to and extending from said casing so as to be turnable together with the latter and having a free end distant from said casing; a stationary support; a first elongated member connected to said support; a second elongated member connected to said free end of said arm and being longitudinally shiftable with respect to said first elongated member; resilient means operatively connected to said first and second elongated members for yieldably resisting movement of said second elongated member with respect to said first elongated member to the same degree in either direction of movement of said second member with respect to said first member; a movable control member carried by one of said elongated members; and a cam carried by the other of said elongated members and engaging said movable control member for moving the latter in response to movement of said second elongated member with respect to said first elongated member.

6. A power arrangement as recited in claim 5 and wherein said movable control member includes a roller which acts as a cam follower and wherein said cam is in the form of a rigid member having a recess in which said roller is partly located in one position of said second elongated member with respect to said first elongated member, so that when said second elongated member moves through a given distance in either direction from said one position thereof said roller becomes located out of said recess to cause said control member to be actuated.

7. A power arrangement as recited in claim 2 and wherein said control means includes a housing carried by said second elongated member for movement therewith; an electrical switch carried by said housing; a cam rotatably carried by said housing and engaging said switch for actuating the latter upon turning of said cam through a predetermined angle; a pinion fixed coaxially to said cam so that the latter turns when said pinion turns; and a rack fixed to said first elongated member and meshing with said pinion so that the latter turns during shifting of said second elongated member with respect to said first elongated member.

8. A power arrangement as recited in claim 2 and wherein said control means includes a housing; an electrical switch carried by said housing; a cam rotatably carried by said housing and engaging said switch for actuating the latter upon turning of said cam through a predetermined angle; a pinion fixed coaxially to said cam so that the latter turns when said pinion turns; and a pair of racks respectively meshing with opposed parts of said pinion and respectively extending in opposite directions therefrom, said racks being respectively connected to said first and second elongated members.

References Cited in the file of this patent

UNITED STATES PATENTS

| | | |
|---|---|---|
| 1,864,348 | Given | June 21, 1932 |
| 1,921,296 | Harkness | Aug. 8, 1933 |
| 2,062,804 | Braga | Dec. 1, 1936 |
| 2,522,451 | Johansen | Sept. 12, 1950 |

FOREIGN PATENTS

| | | |
|---|---|---|
| 409,383 | Great Britain | Apr. 30, 1934 |
| 740,286 | France | Nov. 12, 1932 |
| 502,382 | Great Britain | Mar. 16, 1939 |
| 864,183 | Germany | Jan. 22, 1953 |
| 874,884 | France | May 26, 1942 |